US 12,425,225 B2

(12) United States Patent
Elorch et al.

(10) Patent No.: US 12,425,225 B2
(45) Date of Patent: Sep. 23, 2025

(54) METHOD FOR SECURE REAL-TIME MESSAGE TRANSMISSION BETWEEN A TRANSMITTER AND A RECEIVER WHICH ARE ON BOARD A MOTOR VEHICLE

(71) Applicant: Continental Automotive Technologies GmbH, Hannover (DE)

(72) Inventors: Mounir Elorch, Toulouse (FR); Fabien Deleplanque, Toulouse (FR); Nicolas Guinart, Toulouse (FR)

(73) Assignee: CONTINENTAL AUTOMOTIVE TECHNOLOGIES GMBH, Hannover (DE)

(*) Notice: Subject to any disclaimer, the term of this patent is extended or adjusted under 35 U.S.C. 154(b) by 276 days.

(21) Appl. No.: 18/039,034

(22) PCT Filed: Jul. 23, 2021

(86) PCT No.: PCT/EP2021/070663
§ 371 (c)(1),
(2) Date: May 26, 2023

(87) PCT Pub. No.: WO2022/117237
PCT Pub. Date: Jun. 9, 2022

(65) Prior Publication Data
US 2024/0007296 A1 Jan. 4, 2024

Related U.S. Application Data

(60) Provisional application No. 63/119,903, filed on Dec. 1, 2020.

(30) Foreign Application Priority Data

Jul. 23, 2021 (FR) .................................. 2107978

(51) Int. Cl.
H04L 9/32 (2006.01)
H04L 9/08 (2006.01)

(52) U.S. Cl.
CPC .......... *H04L 9/3242* (2013.01); *H04L 9/0894* (2013.01); *H04L 2209/84* (2013.01)

(58) Field of Classification Search
None
See application file for complete search history.

(56) References Cited

U.S. PATENT DOCUMENTS 9,367,701 B2 6/2016 Merchan et al.
2010/0268949 A1* 10/2010 Schuetze ............ B60C 23/0462
713/168

(Continued)

FOREIGN PATENT DOCUMENTS

WO WO-2015048058 A1 * 4/2015 ......... H04L 63/0227

OTHER PUBLICATIONS

International Search Report and Written Opinion for International Application No. PCT/EP2021/070663, mailed Nov. 22, 2021, 9 pages.

(Continued)

*Primary Examiner* — William J. Goodchild
(74) *Attorney, Agent, or Firm* — Buchanan Ingersoll & Rooney PC

(57) ABSTRACT

A method for the secure transmission of messages in real time between a transmitter and a receiver that are housed on board a motor vehicle. The method includes at least a first step that is executed during a current driving cycle of the motor vehicle and consists in the receiver comparing a received first transmitter authentication code with a first receiver authentication code. The first message being rejected if the first transmitter authentication code differs from the first receiver authentication code, and the first (Continued)

message being accepted if the first transmitter authentication code is identical to the first receiver authentication code.

10 Claims, 2 Drawing Sheets

(56) References Cited

U.S. PATENT DOCUMENTS

| | | |
|---|---|---|
| 2015/0089236 A1 | 3/2015 | Han et al. |
| 2017/0136834 A1 | 5/2017 | Chong et al. |
| 2018/0124030 A1 | 5/2018 | Bima |
| 2020/0207163 A1 | 7/2020 | Schwegler et al. |
| 2020/0244442 A1 | 7/2020 | Zeh et al. |

OTHER PUBLICATIONS

International Search Report and Written Opinion for International Application No. PCT/EP2021/070663, mailed Nov. 22, 2021, 13 pages (French).

French Search Report for French Application No. 2107978, dated May 5, 2023 with translation, 14 pages.

Menezes, A.J. et al., "Key Establishment Protocols", Chapter 12, Oct. 1, 1996, pp. 489-541, Handbook of Applied Cryptography; CRC Press Series on Discrete Mathematics and its Applications, CRC Press, Boca Raton, FL, XP001525012, Retrieved from the Internet: http://www.cacr.math.uwaterloo.ca/hac/.

\* cited by examiner

# METHOD FOR SECURE REAL-TIME MESSAGE TRANSMISSION BETWEEN A TRANSMITTER AND A RECEIVER WHICH ARE ON BOARD A MOTOR VEHICLE

CROSS REFERENCE TO RELATED APPLICATIONS

This application is the U.S. National Phase Application of PCT International Application No. PCT/EP2021/070663, filed Jul. 23, 2021, which claims priority to French Patent Application No. 2107978, filed Jul. 23, 2021 and U.S. Provisional Patent Application No. 63/119,903, filed Dec. 1, 2020, the contents of such applications being incorporated by reference herein.

FIELD OF THE INVENTION

The present patent application relates to a method for the secure transmission of messages in real time between a transmitter and a receiver that are housed on board a motor vehicle, the method being particularly suitable for securing transmissions in a tire pressure monitoring system of a motor vehicle.

BACKGROUND OF THE INVENTION

It is known to equip a motor vehicle with a monitoring system known as a "TPMS" (for "Tire Pressure Monitoring System").

Such a monitoring system generally comprises a central processing unit and electronic devices called "wheel units", each wheel unit being fitted to an associated wheel of the vehicle.

A radiofrequency communication assembly ensures communication between each wheel unit and the central processing unit.

Each wheel unit comprises sensors in order in particular to detect an anomaly with the wheel. These sensors may for example be a tire inflation pressure sensor, a temperature sensor and a wheel acceleration sensor.

In addition, each wheel unit comprises a battery and an associated memory.

Two types of monitoring systems are known: a direct monitoring system that measures the pressure of the tires directly and in real time by way of the associated pressure sensor, and an indirect monitoring system that evaluates the speed of rotation of the wheels of the motor vehicle, for example using the anti-lock braking system.

In the context of the direct monitoring system, it is possible for a malicious person to falsify the content of a radiofrequency communication frame from a wheel unit and to transmit these incorrect data to the central computer of the vehicle.

Upon receiving a frame comprising the known communication protocol, the central computer performs a simple check on the identifier of the transmitter of this frame.

Thus, if this identifier is known to the vehicle, the data contained in this frame are then accepted and processed.

For example, in the event of low pressure, a false pressure alert may then be raised and displayed on the dashboard of the vehicle.

This type of falsification may cause dissatisfaction for the driver of the vehicle, vehicles being returned to garages and, ultimately, a lack of trust in the direct monitoring system.

Moreover, such falsification may allow a malicious person to cause the vehicle to be stopped by its driver for said driver to check the veracity of this alert. During this stop, the malicious person will thus have the opportunity to steal the vehicle.

With the emergence of autonomous vehicles, this scenario is becoming critical since, in the event of a pressure alert for one of the wheels, the vehicle will stop immediately, thus causing a service interruption.

Document EP-A1-3050251, incorporated herein by reference, is known and describes and represents a method for authenticating message frames transmitted via a communication network of a motor vehicle, by way of a message authentication code, known by the acronym MAC.

The message authentication code is a code that accompanies data for the purpose of ensuring the integrity of said data, by making it possible to verify that they have not been subject to any modification, after transmission for example.

In addition, the authentication code makes it possible to ensure that the identity of the transmitting wheel unit has not been spoofed, thus legitimizing the content of the transmitted message.

The type of secure transmission method described in document EP-A1-3050251 is effective, but is not optimized for the transmission of data in a "TPMS" monitoring system.

Indeed, the method described in document EP-A1-3050251 is based on wired bidirectional communication between two parties, which guarantees the infallibility of the exchanges.

This method authenticates a second message on the assumption that the parameters that set up this authentication and that are transmitted in a first message will have been received correctly by the receiver.

However, in the case of radiofrequency wireless communication, messages may frequently be lost, for example due to electromagnetic interference.

Thus, when applying the method described in document EP-A1-3050251 to a wireless communication system, such as for a TPMS system, some messages would not be lastingly authenticated, which would result in a breakdown, as if the wheel units that failed to authenticate were out of service.

SUMMARY OF THE INVENTION

An aspect of the present invention aims in particular to solve these drawbacks and to propose an alternative transmission method.

These objectives, along with others that will become apparent on reading the following description, are achieved with a method for the secure transmission of messages in real time between a transmitter and a receiver that are housed on board a motor vehicle, characterized in that it comprises at least a first step that is executed during a current driving cycle of the motor vehicle and that consists in:

generating a first current arbitrary number,
the transmitter establishing a first transmitter authentication code produced by an authentication algorithm with a first authentication parameter at input of said algorithm, the first authentication parameter comprising at least:
i. a second previous arbitrary number stored by the transmitter during a previous driving cycle of the motor vehicle, and
ii. a first encryption key,
the transmitter transmitting at least a first message that comprises:

i. said first encryption key and the first current arbitrary number, which are encrypted by a second encryption key, and ii. said first transmitter authentication code, the receiver receiving said first message, the receiver establishing a first receiver authentication code produced by an authentication algorithm with the first authentication parameter at input of said algorithm, the first authentication parameter comprising at least:

i. the second previous arbitrary number received and stored by the receiver during said previous driving cycle, and ii. the first encryption key received in said previously received first message, the receiver comparing the received first transmitter authentication code with the first receiver authentication code, the first message being rejected if the first transmitter authentication code differs from the first receiver authentication code, and the first message being accepted if the first transmitter authentication code is identical to the first receiver authentication code.

The method according to an aspect of the invention makes it possible to time-limit the validity of a message to one driving cycle of the motor vehicle, such that a message recorded by an attacker in a previous driving cycle and returned to a current driving cycle will be rejected due to the obsolescence of the returned message, thereby making it possible in particular to prevent a message replication attack.

In practice, during this first step of the method, a plurality of first messages are sent to compensate for the potential loss of one or more first messages during transmission thereof.

According to other optional features of the method according to an aspect of the invention, taken individually or in combination:

the method comprises at least a second step that is carried out following the first step during said current driving cycle and that consists in:

the transmitter establishing a second transmitter authentication code produced by the authentication algorithm with a second authentication parameter at input of said algorithm, the second authentication parameter comprising at least:

i. the first current arbitrary number stored by the transmitter during the first step, and ii. the first encryption key, the transmitter transmitting at least a second message that comprises said second transmitter authentication code, the receiver receiving said second message, the receiver establishing a second receiver authentication code produced by the authentication algorithm with the second authentication parameter at input of said algorithm, the second authentication parameter comprising at least:

i. the first current arbitrary number received and stored by the receiver during said first step, and ii. the first encryption key received and stored by the receiver during said first step, the receiver comparing the received second transmitter authentication code with the second receiver authentication code, the second message being rejected if the second transmitter authentication code differs from the second receiver authentication code, and the second message being accepted if the second transmitter authentication code is identical to the second receiver authentication code;

the first step constitutes a learning phase during which the transmitter, which is associated with an identifier, transmits a plurality of successive first messages to the receiver so as to allow the transmitter to be identified by the receiver if the transmitter is unknown to the receiver, the identifier of the transmitter being able to be validated upon receipt of the first message by the receiver if the transmitted first transmitter authentication code is identical to the received first receiver authentication code. This feature makes it possible to limit the duration of the learning of an unknown transmitter;

the learning phase is able to be executed in the event of memory loss of the transmitter;

each authentication parameter comprises functional data of the motor vehicle that contribute to establishing said authentication codes. The changeable and unpredictable nature of the operating data strengthens the authentication codes;

the transmitter is a wheel unit and the receiver is a central unit, the transmitter and the receiver belonging to a tire pressure monitoring system of the motor vehicle;

the second symmetric encryption key is stored in a non-volatile memory of the transmitter and in a non-volatile memory of the receiver;

each arbitrary number is a random session number that is generated by the transmitter at the start of each driving cycle of the motor vehicle;

the transmission and the reception of each message between the receiver and the transmitter are carried out through radiofrequency.

An aspect of the present invention also relates to a motor vehicle that comprises a tire pressure monitoring system comprising at least one wheel unit forming a transmitter and at least one central unit forming a receiver, characterized in that said central unit, and/or said wheel unit, are duly programmed to implement the method described above.

BRIEF DESCRIPTION OF THE DRAWINGS

Other features and advantages of aspects of the invention will become apparent on reading the following description, with reference to the appended figures, in which.

For greater clarity, identical or similar elements are denoted by identical or similar reference signs throughout the figures.

DETAILED DESCRIPTION OF THE PREFERRED EMBODIMENTS

Figure 1:
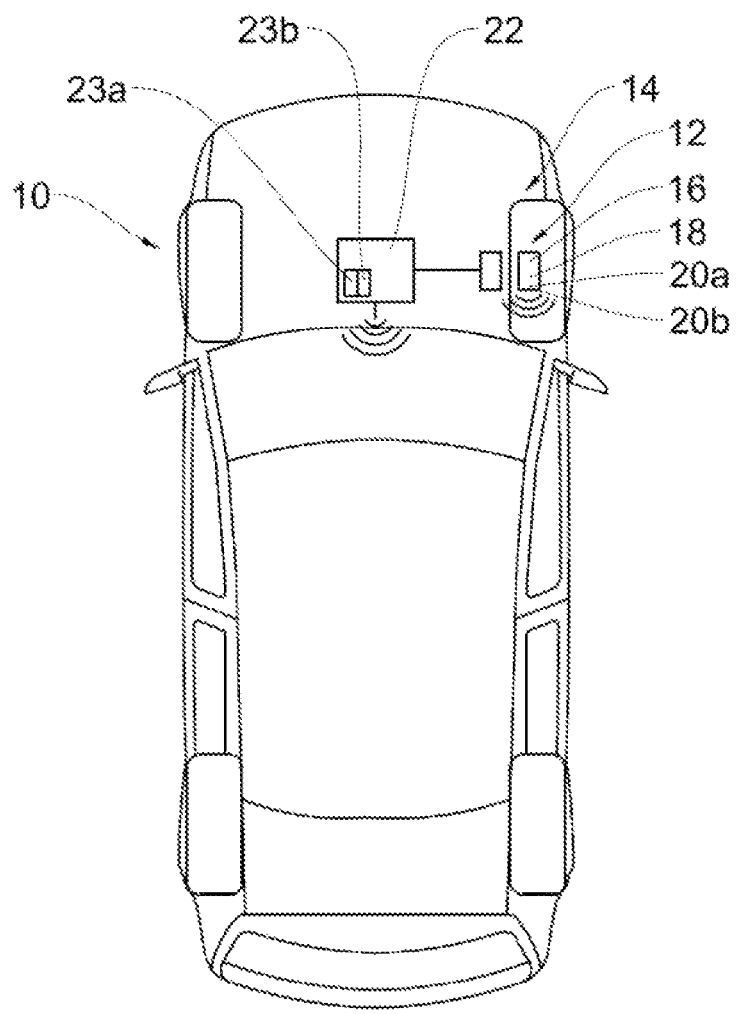
FIG. 1 illustrates a schematic plan view of a motor vehicle equipped with a tire pressure monitoring system comprising a wheel unit and a central unit.

FIG. 1 shows a motor vehicle 10 that is equipped with a "TPMS" (for "Tire Pressure Monitoring System") monitoring system.

More particularly, the motor vehicle 10 is equipped with four wheel units that each form an electronic device and that are each mounted on an associated wheel of the motor vehicle 10.

For the sake of clarity, only one wheel unit, referenced 12 and associated with a wheel 14, is described in the remainder of the description.

The wheel unit 12 comprises an electronic box that contains a set of sensors, such as a temperature sensor and a tire pressure sensor for the associated wheel 14.

The wheel unit 12 also comprises a computer 16, a battery 18 and a volatile memory 20a and a non-volatile memory 20b, of flash type for example.

The motor vehicle 10 comprises a central unit 22 that is equipped with a volatile memory 23a and a non-volatile memory 23b of flash type and that communicates with the wheel unit 12 via a radiofrequency communication system.

For this purpose, the wheel unit 12 forms a transmitter that communicates with the central unit 22 forming a receiver.

The wheel unit 12 operates in a plurality of distinct operating modes, each operating mode meeting a need depending on the instantaneous use of the wheel unit 12.

As may be seen in FIG. 2, the wheel unit 12 operates in a stationary mode A, which is adopted when the motor vehicle 10 is at a standstill, a first intermediate mode B1, which is adopted upon leaving the stationary mode A, when the motor vehicle 10 begins a new driving cycle, a second intermediate mode B2, which is adopted following the first intermediate mode B1, a driving mode C and an interim mode D, which are described below.

A "driving cycle" is understood to mean all of the phases that correspond to the driving of the motor vehicle 10, from leaving the stationary mode A until re-entering the stationary mode A of the unit wheel 12.

It will be noted that the stationary mode A of the wheel unit 12 is adopted when the motor vehicle 10 has been at a standstill for a determined time, as described below.

An aspect of the invention relates more particularly to a method for the secure transmission of messages in real time between the wheel unit 12, forming a transmitter, and the central unit 22, forming a receiver.

A "message" is understood to mean a computer-based frame that comprises a block of information.

The method is executed in each driving cycle of the motor vehicle 10. In the present description, a current driving cycle is described in detail and reference is made to a previous driving cycle that precedes the current driving cycle.

The method comprises a first step, which is carried out during the first intermediate mode B1 and which consists in generating a first current arbitrary number Nbx, which is a session number intended to guarantee the obsolescence of the validity of the transmitted messages.

In each new driving cycle, a new current arbitrary number Nbx is generated to replace a previous arbitrary number Nbx-1, upon the transition from the stationary mode A to the first intermediate mode B1 adopted by the wheel unit 12.

In addition, each arbitrary number is generated randomly by way of a random number generator.

The first step of the method also consists in the wheel unit 12 establishing a first transmitter message authentication code MAC1-E. A message authentication code, often referred to by its acronym MAC, is a code accompanying data for the purpose of ensuring the authenticity of said data, by making it possible to verify that they have not been subject to identity spoofing, after transmission for example.

Figure 3:
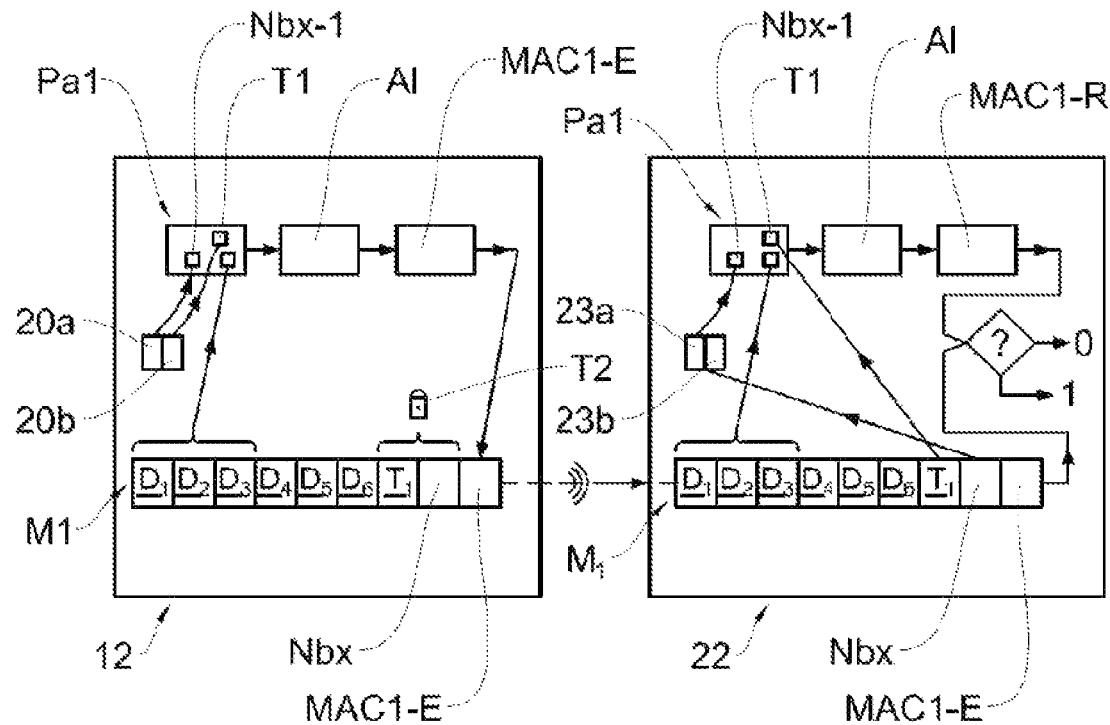
FIG. 3 illustrates a flowchart showing the execution of the first step of the method according to an aspect of the invention.

With reference to FIG. 3, the first transmitter authentication code MAC1-E is produced by an authentication algorithm Al with a first authentication parameter Pa1 at input of the algorithm.

The first authentication parameter Pa1 comprises the second previous arbitrary number Nbx-1 that was generated by the wheel unit 12, and stored by the associated volatile memory 20a, during the previous driving cycle.

In addition, the first authentication parameter Pa1 comprises a first encryption key T1.

The first encryption key T1 is a unique key produced by a random number generator, also designated by its acronym TRNG for "True Random Number Generator".

The desired aim is to have a population of first encryption keys T1 numerous enough to limit the probability of an attacker finding the first encryption keys through brute force.

The first authentication parameter Pa1 also comprises functional data recorded by the sensors of the wheel unit 12, namely the pressure D1 of the tires, the temperature D2 and the acceleration D3 of the wheel unit 12.

The first encryption key T1 is stored in the non-volatile memory 20b of the wheel unit 12 during the manufacture of the wheel unit 12.

Following the production of the first transmitter authentication code MAC1-E, the first step of the method consists in the transmitting wheel unit 12 transmitting a plurality of first messages M1, as may be seen in FIG. 3.

The first messages M1 are transmitted during the first intermediate mode B1 adopted by the wheel unit 12, upon leaving the stationary mode A.

During the first intermediate mode B1 and the first step of the method, the first messages M1 are transmitted successively with a defined periodicity, for example of sixteen seconds.

The first messages M1 are identical and each comply with a determined architecture, or frame.

More precisely, the first messages M1 each comprise functional data, namely the pressure D1 of the tires, the temperature D2, the acceleration D3, the identifier D4 of the wheel unit 12, the adopted mode D5 and a synchronization datum D6.

In addition, the first messages M1 each comprise the first encryption key T1, the first current arbitrary number Nbx, and the first transmitter authentication code MAC1-E established beforehand by the wheel unit 12.

The first encryption key T1 and the first current arbitrary number Nbx are encrypted by way of a second symmetric encryption key T2 according to the standard known by the acronym AES, for "Advanced Encryption Standard".

It will be noted that the second encryption key T2 is identical for all of the wheel units 12 and the central units 22 of one and the same client.

Preferably, the second encryption key T2 is saved in a secure space, such as a secure database.

The second encryption key T2 is also stored in the non-volatile memory 23b of the central unit 22 and in the non-volatile memory 20b of the wheel unit 12.

Still during the first step of the method, corresponding to the first intermediate mode 131, the first messages M1 are received by the central unit 22.

Upon receipt of each first message M1, the central unit 22 establishes a first receiver authentication code MAC1-R produced by the authentication algorithm Al with the first authentication parameter Pa1 at input of the authentication algorithm Al.

The first authentication parameter Pa1 comprises the second previous arbitrary number Nbx-1 received by the central unit 22 and stored in the volatile memory 23a of the central unit 22 during the previous driving cycle, and the first encryption key T1 received in each of the previously received first messages M1.

For each received first message M1 and after having established the associated first receiver authentication code MAC1-R, the central unit 22 compares the established first receiver authentication code MAC1-R with the first transmitter authentication code MAC1-E received from the wheel unit 12.

After comparison, each received first message M1 is rejected if the first transmitter authentication code MAC1-E differs from the first receiver authentication code MAC1-R.

Conversely, each received first message M1 is accepted if the first transmitter authentication code MAC1-E is identical to the first receiver authentication code MAC1-R.

The method comprises a second step that is carried out during the second intermediate mode B2 and that is carried out following the first step.

The second step of the method consists in the transmitting wheel unit 12 establishing a second transmitter message authentication code MAC2-E produced by the authentication algorithm Al with a second authentication parameter Pa2 at input of the algorithm Al.

The second authentication parameter Pa2 comprises the first current arbitrary number Nbx stored by the wheel unit 12 during the first step of the method corresponding to the first intermediate mode B1.

In addition, the second authentication parameter Pa2 comprises the first encryption key T1.

Figure 4:
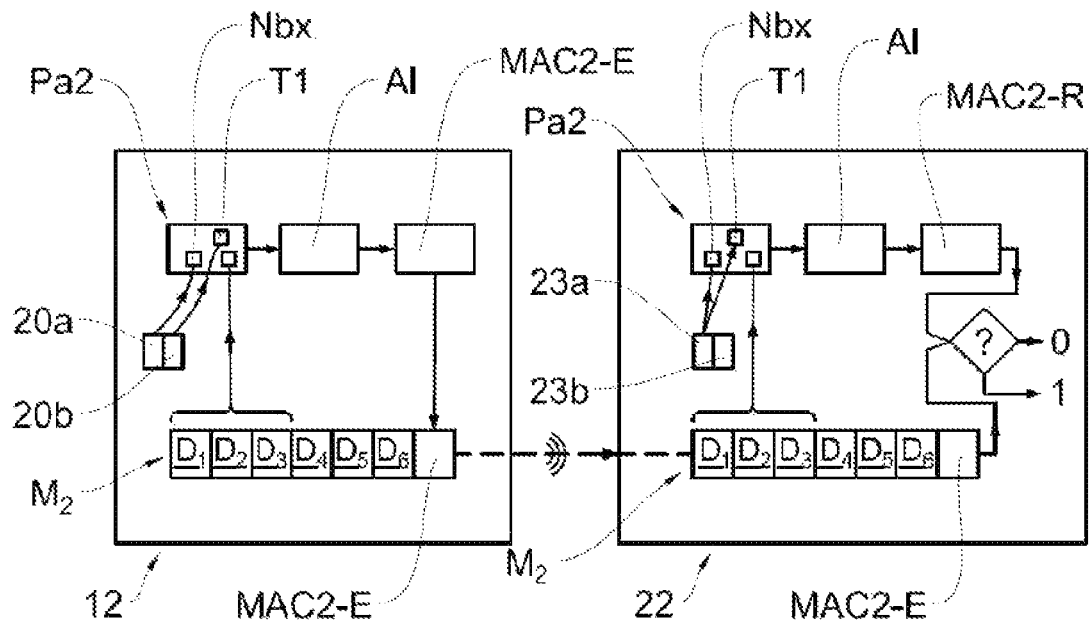
FIG. 4 illustrates a flowchart showing the execution of the second step of the method according to an aspect of the invention.

Following the production of the second transmitter authentication code MAC2-E, the second step of the method consists in the transmitting wheel unit 12 transmitting a plurality of second messages M2, as may be seen in FIG. 4.

During the second step, which corresponds to the second intermediate mode B2, the second messages M2 are transmitted successively with a defined periodicity, for example of sixteen seconds.

The wheel unit 12 changes from the second intermediate mode B2 to the driving mode C when the transmitted second messages M2 reach or exceed a predetermined number, for example the number of twenty transmitted second messages M2.

The second messages M2 are identical and each comply with a determined architecture, or frame.

More precisely, the second messages M2 each comprise functional data, namely the pressure D1 of the tires, the temperature D2 and the acceleration D3.

In addition, the second messages M2 each comprise the second transmitter authentication code MAC2-E established beforehand by the wheel unit 12.

Still during the second step of the method, and the second intermediate mode B2, the second messages M2 are received by the central unit 22.

Upon receipt of each second message M2, the central unit 22 establishes a second receiver authentication code MAC2-R produced by the authentication algorithm Al with the second authentication parameter Pa2 at input of the authentication algorithm Al.

The second authentication parameter Pa2 comprises the first current arbitrary number Nbx and the first encryption key T1, which are extracted from the first messages M1 and stored in the volatile memory 23a of the central unit 22 during the first step.

For each received second message M2 and after having established the associated second receiver authentication code MAC2-R, the central unit 22 compares the established second receiver authentication code MAC2-R with the second transmitter authentication code MAC2-E received from the wheel unit 12.

After comparison, each received second message M2 is rejected if the second transmitter authentication code MAC2-E differs from the second receiver authentication code MAC2-R.

Conversely, each received second message M2 is accepted if the second transmitter authentication code MAC2-E is identical to the second receiver authentication code MAC2-R.

In some situations, the identifier of the wheel unit 12 is unknown to the central unit 22, in particular when the wheel unit 12 has just been mounted on the associated wheel 14, for example in order to replace a defective wheel unit 12.

In such a situation, the first step of the method constitutes a learning phase, performed by successively transmitting first messages M1 from the wheel unit 12 to the central unit 22.

The number of first messages M1 necessary for the central unit 22 to learn the identifier of the wheel unit 12 in question during the learning phase is for example twenty messages.

Conversely, the identification of the wheel unit 12 is validated by the central unit 22 upon receipt of the first message M1 by the central unit 22 if the transmitted first transmitter authentication code MAC1-E is identical to the first receiver authentication code MAC1-R.

Indeed, the match between the first transmitter authentication code MAC1-E and the first receiver authentication code MAC1-R means that the transmitting wheel unit 12 was already present on the wheel 14 during the previous driving cycle.

This feature makes it possible to limit the learning time needed by the central unit 22 to identify a new wheel unit 12.

Similarly, in the event of resetting of the wheel unit 12 that occurred for example due to a power outage, the wheel unit 12 loses the data stored in its volatile memory 20a, in particular the first current arbitrary number Nbx and the second previous arbitrary number Nbx-1.

The wheel unit 12 is therefore no longer able to establish either the first transmitter authentication code MAC1-E or the second authentication code MAC2-E.

To overcome this problem, a new learning phase, such as the learning phase described above, is launched, if the current mode adopted by the wheel unit 12 is the first intermediate mode B1, which corresponds to the first step of the method, or a previous mode.

If the current mode adopted by the wheel unit 12 is a mode following the first intermediate mode B1, the central unit 22 knows the identifier of the transmitting wheel unit 12, which is transmitted via the messages sent by the wheel unit 12, and the central unit 22 is able to detect an anomaly since the transmitter authentication code MAC2-E received by the central unit 22 is invalid.

In such a situation in which the central unit 22 knows the identifier of the wheel unit 12 and the central unit 22 invalidates the associated transmitter authentication code MAC2-E, a new learning phase dedicated only to the wheel unit 12 in question is launched.

Figure 2:
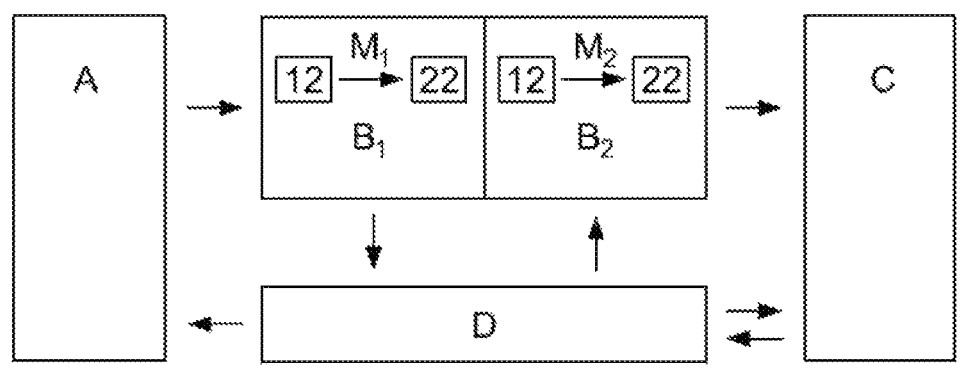
FIG. 2 illustrates a flowchart showing the various operating modes adopted by the wheel unit of FIG. 1, during the method according to an aspect of the invention.

With reference to FIG. 2, the change from one operating mode of the wheel unit 12 to another is organized as follows.

The first intermediate mode B1 is adopted by the wheel unit 12 upon leaving the stationary mode A, when the motor vehicle 10 begins a new driving cycle.

The wheel unit 12 is equipped with a message counter (not shown) that counts the first messages M1 and second messages M2 transmitted during the intermediate modes B1, B2.

The wheel unit 12 changes from the first intermediate mode B1 to the second intermediate mode B2 when the message counter reaches or exceeds a predetermined number, for example the number of twenty messages.

The wheel unit 12 changes from the second intermediate mode B2 to the driving mode C when the motor vehicle 10 is moving and the counter reaches or exceeds a predetermined number, for example the number of forty messages.

In the driving mode C, the message exchange between the wheel unit 12 and the central unit 22 continues while complying with the second step of the method described above, with the difference that the sending periodicity of the second messages M2 changes from sixteen seconds to sixty-four seconds.

If the motor vehicle 10 stops in intermediate mode B1, B2, the wheel unit 12 changes to interim mode D.

Likewise, if the motor vehicle 10 stops in driving mode C, the wheel unit 12 changes to interim mode D.

In the interim mode D, the message exchange between the wheel unit 12 and the central unit 22 continues while complying with the second step of the method described above.

The wheel unit 12 leaves the interim mode D to selectively adopt the first intermediate mode B1 if the counter has not reached a predetermined number, for example the number of forty messages, or the driving mode C if the counter has reached the number of forty messages and the motor vehicle 10 is moving, or the stationary mode A if the motor vehicle has been at a standstill for a predetermined time, for example nineteen minutes.

The invention claimed is:

1. A method for the secure transmission of messages in real time between a transmitter and a receiver that are housed on board a motor vehicle, the method comprising at least a first step that is executed during a current driving cycle of the motor vehicle and further comprises:
   generating a first current arbitrary number,
   the transmitter establishing a first transmitter authentication code produced by an authentication algorithm with a first authentication parameter at input of said algorithm, the first authentication parameter comprising at least:
   i. a second previous arbitrary number stored by the transmitter during a previous driving cycle of the motor vehicle, and
   ii. a first encryption key,
   the transmitter transmitting at least a first message that comprises:
   i. said first encryption key and the first current arbitrary number, which are encrypted by a second encryption key, and
   ii. said first transmitter authentication code,
   the receiver receiving said first message,
   the receiver establishing a first receiver authentication code produced by an authentication algorithm with the first authentication parameter at input of said algorithm, the first authentication parameter comprising at least:
   i. the second previous arbitrary number received and stored by the receiver during said previous driving cycle, and
   ii. the first encryption key received in said previously received first message,
   the receiver comparing the received first transmitter authentication code with the first receiver authentication code, the first message being rejected if the first transmitter authentication code differs from the first receiver authentication code, and the first message being accepted if the first transmitter authentication code is identical to the first receiver authentication code.

2. The method as claimed in claim 1, further comprising at least a second step that is carried out following the first step during said current driving cycle and comprises:
   the transmitter establishing a second transmitter authentication code produced by the authentication algorithm with a second authentication parameter at input of said algorithm, the second authentication parameter comprising at least:
   i. the first current arbitrary number stored by the transmitter during the first step, and
   ii. the first encryption key,
   the transmitter transmitting at least a second message that comprises said second transmitter authentication code,
   the receiver receiving said second message,
   the receiver establishing a second receiver authentication code produced by the authentication algorithm with the second authentication parameter at input of said algorithm, the second authentication parameter comprising at least:
   i. the first current arbitrary number received and stored by the receiver during said first step, and
   ii. the first encryption key received and stored by the receiver during said first step,
   the receiver comparing the received second transmitter authentication code with the second receiver authentication code, the second message being rejected if the second transmitter authentication code differs from the second receiver authentication code, and the second message being accepted if the second transmitter authentication code is identical to the second receiver authentication code.

3. The method as claimed in claim 1, wherein the first step constitutes a learning phase during which the transmitter, which is associated with an identifier, transmits a plurality of successive first messages to the receiver so as to allow the transmitter to be identified by the receiver if the transmitter is unknown to the receiver, the identifier of the transmitter being able to be validated upon receipt of the first message by the receiver if the transmitted first transmitter authentication code is identical to the received first receiver authentication code.

4. The method as claimed in claim 3, wherein the learning phase is able to be executed in the event of memory loss of the transmitter.

5. The method as claimed in claim 1, wherein each authentication parameter comprises functional data of the motor vehicle that contribute to establishing said authentication codes.

6. The method as claimed in claim 1, wherein the transmitter is a wheel unit and the receiver is a central unit, the transmitter and the receiver belonging to a tire pressure monitoring system of the motor vehicle.

7. The method as claimed in claim 1, wherein the second symmetric encryption key is stored in a non-volatile memory of the transmitter and in a non-volatile memory of the receiver.

8. The method as claimed in claim 1, wherein each arbitrary number is a random session number that is generated by the transmitter at the start of each driving cycle of the motor vehicle.

9. The method as claimed in claim 1, wherein the transmission and the reception of each message between the receiver and the transmitter are carried out through radiofrequency.

10. A motor vehicle that comprises a tire pressure monitoring system comprising at least one wheel unit forming a transmitter and at least one central unit forming a receiver, wherein said central unit, and/or said wheel unit, are duly programmed to implement the method as claimed in claim 1.

* * * * *